Nov. 15, 1949    G. E. PORTER    2,488,433
BRAKE ASSISTER
Filed Dec. 23, 1947
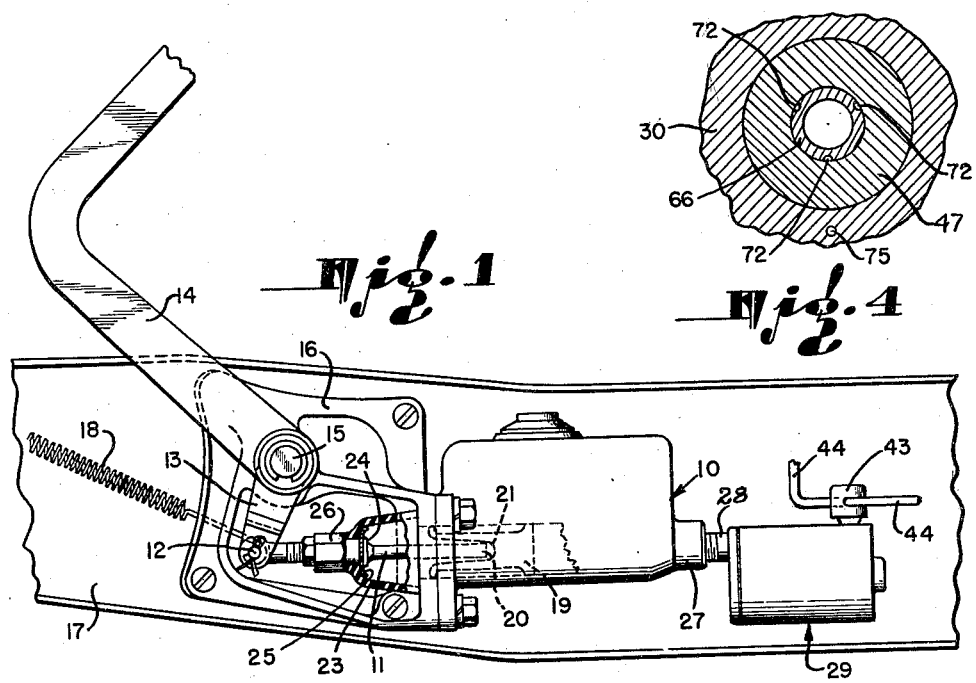
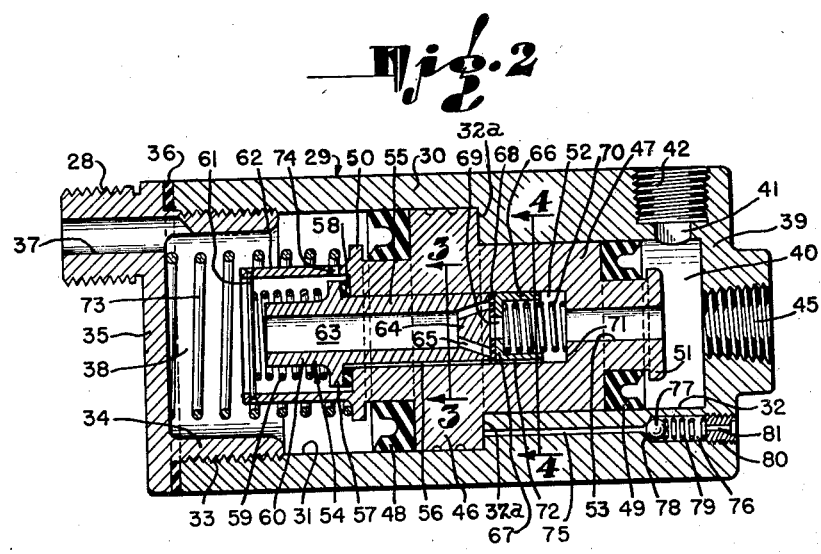
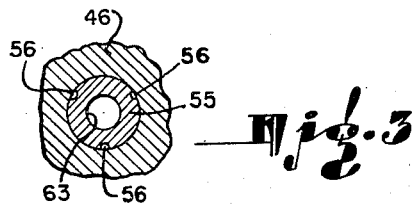
Inventor
GILBERT E. PORTER
By
Attorney Patented Nov. 15, 1949

2,488,433

UNITED STATES PATENT OFFICE 2,488,433

BRAKE ASSISTER

Gilbert E. Porter, North Hollywood, Calif., assignor of one-half to R. Welton Whann, Los Angeles, Calif.

Application December 23, 1947, Serial No. 793,427

12 Claims. (Cl. 60—54.5)

This invention relates generally to hydraulic actuating devices and relates more particularly to brake assisters for hydraulic brake systems for motor vehicles or the like.

While the invention has particular application to a construction in which the wheels of a vehicle are provided with hydraulically actuated brake mechanisms, and is shown and described in connection therewith, it is to be understood that it is not limited thereto.

As is well known in the art, it is often difficult to effect the nicety of brake control that is most desired, and it is also difficult to maintain the proper brake pressure immediately after the initial application of the brakes. For example, the momentum of the initial brake applying movement will give a hard application of the brakes, but the operator has difficulty in maintaining a suitable brake applying pressure with his foot after said initial movement as it requires a very substantial pressure on the brake pedal to maintain a braking force on the brake shoes of a value approximating that of the initial application, if such force is required.

It is, therefore, an object of the invention to provide a brake assister for incorporation in the hydraulic line of the brake system which will provide easy and accurate control of the brake actuating pressure and hence will provide easy and accurate control of the brakes of the vehicle.

Another object of the invention is to provide a device of this character whereby the initial braking pressure may be held and maintained with relative ease and without the exertion on the part of the operator of a continued hard pressure on the brake pedal.

Still another object of the invention is to provide a device of this character wherewith loss of pedal is minimized.

A further object of the invention is to provide a device of this character with which a boost or multiplication of the brake applying force may be effected.

A still further object of the invention is to provide a device of this character which may be readily inserted into the line of present hydraulic brake systems, as by attachment to the master cylinder.

Further objects of the invention are to provide a device of this character that is simple in construction, effective in operation, and easy to install.

Other objects and advantages of the invention will be apparent from the following part of the specification.

Referring to the drawing, which is for illustrative purposes only,

Fig. 1 is a side view of portions of a hydraulic brake system embodying the present invention;

Fig. 2 is an enlarged longitudinal sectional view of the present device;

Fig. 3 is a partial section taken on line 3—3 of Fig. 2; and

Fig. 4 is a partial section taken on line 4—4 of Fig. 2.

Referring more particularly to Fig. 1, there is shown a conventional master cylinder, indicated generally at 10, having a piston rod 11 pivotally connected by a pin 12 to an arm 13 of a brake pedal 14, which is pivotally mounted on a shaft 15 secured in a supporting frame 16 attached in the usual manner to the frame 17 of the vehicle. A spring 18 has one end attached to the pin 12 and the other end suitably attached to a fixed member, not shown, whereby the brake pedal is maintained in its normal inoperative position, at which time the piston 19 of the master cylinder is also in its normal inoperative position.

The piston rod 11 has a rounded or ball-like end 20 which is received in a socket 21 of the piston 19, said socket being tapered outwardly so that the piston rod 11 may move in a short arc as the brake pedal 14 is actuated.

A flexible rubber-like cap or hood 23 closes the adjacent end of the master cylinder and permits operative movements of the piston rod 11, said cap having an opening therethrough for reception of said piston rod which has a shoulder 24 against which a washer 25 abuts, the cap portion surrounding the piston rod being clamped between said washer and a nut 26 threaded onto said piston rod.

The opposite end of the master cylinder is provided with an internally threaded extension 27 into which a nipple 28 of the brake assister, indicated generally at 29, is screwed.

As shown, the brake assister comprises a body 30 having a longitudinally extending cylindrical bore 31 and an axially aligned bore 32 of smaller diameter than said bore 31, there being a shoulder 32a at the junction of said cylinders 31 and 32. The outer end portion of the bore or cylinder 31 is internally threaded, as at 33, for reception of an externally threaded tubular flange 34 of an end plate 35, said nipple 28 being formed integrally with said plate 35. A gasket 36 is provided between the plate 35 and the adjacent end of the body 30, and said nipple has a passage 37 therethrough which communicates with the interior of said flange portion 34 which, with the cylinder 31, provides a large diameter chamber 38, the purpose of which will be hereinafter described. The outer end of the cylinder 32 is closed by a wall 39 to define a small diameter chamber 40, the purpose of which will also be hereinafter described.

The chamber 40 has an outlet 41 adjacent the top thereof, a portion of which is threaded as at 42 for reception of the nipple of a fixture 43 having connections 44 to the cylinders of the brake units (not shown) in the wheels of the vehicle. A tapped bore 45 also may be provided for the chamber 40 and provides means for connecting said chamber with the switch of a stop light or the like.

Within the casing 30 is a differential piston having a large diameter portion 46 which is adapted to reciprocate in the cylinder 31 and a small diameter portion 47 which is adapted to reciprocate in the small cylinder 32, said piston dividing the cylinder into two parts, and is disposed between the chambers 38 and 40. The flow of fluid past the portions 46 and 47 of the piston is prevented by the usual sealing rings 48 and 49 respectively, the flanges 50 and 51 of the piston aiding in retaining the respective rings 48 and 49 in position.

The piston is provided with a passage 52 which extends axially or longitudinally from the left-hand end thereof, as shown in Fig. 2, and a passage 53 connects the passage 52 with the chamber 40, said passage 53 being of smaller diameter than the passage 52. Within the passage 52 is a valve 54 which has a body 55 with a plurality of longitudinally extending exterior grooves 56, best seen in Fig. 3, for the flow of fluid therethrough. Three grooves 56 are shown by way of example only, as any suitable number of such grooves may be provided, or grooves for the flow of fluid past the body 55 may be formed in the walls of the passage 52. Or, if desired, the outside diameter of the valve body 55 may be sufficiently less than the diameter of the passage 53 so that fluid may flow past said valve under conditions to be hereinafter described.

In order to control the flow of fluid past said valve body, there is provided thereon an outwardly extending annular flange 57 to which is bonded a seal 58 adapted to engage the adjacent end of the piston and prevent the flow of fluid past said valve body 55.

In order to yieldingly urge the valve 54 closed, a spring 59 is provided, said spring being disposed about portion 60 of said valve 54 which extends outwardly into the chamber 38. The respective ends of the spring 59 react against the flange 55 and a pin 61 which extends diametrically across a cylindrical extension 62 of the piston, said extension surrounding said spring and being open at its free end.

The valve 54 is provided with a passage 63 which is closed by a wall 64 at its right-hand end, as shown in Fig. 2, said wall having a plurality of passages 65 which communicate with the adjacent end of the valve 54 adjacent the periphery thereof.

The right-hand end of the valve 54 is spaced from the adjacent end of the passage 52 to provide space for a valve member 66 slidable in said right-hand end portion of passage 52. The valve 66 is generally tubular in shape and has an end wall 67 to which is bonded a seal 68, there being an opening 69 which extends through said seal and wall 67, and said valve 66 is urged closed by a spring 70 which reacts against the inner side of the wall 67 and shoulder 71 at the adjacent end of the passage 52.

The valve member 66 is also provided with longitudinally extending external grooves 72 (best shown in Fig. 4), for the flow of fluid therepast, and it is to be noted that the outside diameter of the seal 68 is less than the outside diameter of the valve member 66 so that fluid from the grooves 72 may flow therepast and enter the grooves 56 of the valve body 55.

The piston is urged to the right, as shown in Fig. 2, by a relatively light spring 73 which reacts between the plate 35 and the flange 50, a portion of said spring being disposed about the axial extension 62 of the piston.

It is to be noted that the passage 37 of the nipple communicates with the chamber 38 adjacent the top thereof, so that it is unnecessary to provide a special bleed for said chamber, and it is also to be noted that the extension 62 has a bleed port 74 to permit the escape of air from the interior thereof should air become pocketed within said extension, said bleed port 74 being at the top of the chamber formed by said extension.

The spring 73 urges the piston to the right, as shown in Fig. 2, and rightward movement of said piston is limited by abutment of one side of the enlarged portion 46 against the adjacent shoulder 32a.

Should air be trapped between the large portion 46 of the piston and the shoulder 32a, said air may be expelled or escape through a small passage 75 which extends longitudinally of the housing 30 and opens into an enlarged portion 76 within which is disposed a ball valve 77, urged against a seat 78 by a spring 79 which reacts against said ball and a plug 80 threadably received in the outer end of the enlarged portion 76, said plug having a small passage 81 therethrough providing communication with the passage 76 and atmosphere.

The operation of the present device is as follows:

When the brake pedal 14 is depressed, the piston 19 of the master cylinder is actuated to provide fluid pressure for actuating the brake units in the wheels. When the piston 19 builds up pressure in the master cylinder, this pressure is transmitted to the chamber 38, Fig. 2, and thence through the passage 63 and passages 65. The pressure of the fluid in the passages 65 unseat the valves 66, and fluid pressure is transmitted between said valve and the adjacent end of the valve 54. This pressure is then transmitted through the passage 69 of the valve 66, passage 53 in the piston, and thence to the chamber 40 from which it is transmitted through the passage 41, fixture 43 and fluid lines 44 to the cylinders of the individual brake units.

When the initial application of the brakes is made, the momentum builds up a considerable braking pressure and this pressure is held due to the fact that the check valve 66 will prevent a flow of fluid from the small chamber 40 through the passages 65 and 63 to the large chamber 38, and the operator may relax his leg after the initial application of the brakes without losing the initial pressure due to the prevention of a return flow past said check valve 66. At this time the valve 54 is maintained closed against its seat because the area thereof subjected to pressure in the chamber 38 is much greater than the combined area of the grooves 56 through which fluid otherwise would be transmitted from the chamber 40 to the chamber 38.

Due to the large area of the large diameter portion of the differential piston as compared with the small diameter area thereof, the pressure in the chamber 38 may be allowed to drop very substantially without causing the piston to move leftwardly from the position shown in Fig. 2.

For example, let it be assumed that the effective area of the large diameter portion 46 of the piston is twice the effective area of the small diameter portion, the fluid pressure in the chamber 38 may drop to a value of one-half of the pressure in the chamber 40, less the force of spring 73, before the piston will begin to move leftwardly. Should the pressure in chamber 38 drop below this value, the piston will move to the left. Should the brake pedal be thereafter actuated before the pressure in chamber 38 has dropped sufficiently to permit valve 54 to open, increase of pressure in the chamber 38 will cause the differential piston to move toward the right and multiply the pressure in the chamber 40, lines 44 and brake unit cylinders. Hence, a boost effect will be provided.

When the brake pedal is released so that the pressure in chamber 38 drops to its minimum value, fluid in the chamber 40 will flow through the passage 53 into the adjacent portion of the passage 52 through the grooves 72 in the valve 66, and thence through the grooves 56 in the valve body 55. The pressure of the fluid in the grooves 56 will then be sufficient to overcome the force of spring 59 and cause the valve 54 to move toward the left to permit flow of fluid into the chamber 38.

Due to the closing force of the spring 59 on the valve 54, a slight residual pressure will remain in the chamber 40, lines 44, and brake unit cylinders. This pressure will be insufficient to cause the brake shoes to be applied to the brake drums, but it has an advantage in that an initial pressure is present so that there will be a quicker application of the brakes upon actuation of the brake pedal 14.

I claim:

1. In a fluid pressure assister having an inlet adapted to be connected to a source of fluid pressure and an outlet adapted to be connected to a device to be energized: a differential piston having faces of different effective area, said outlet being in fluid communication with the assister at the smaller face of said piston; means providing fluid communication between said inlet and outlet; a check valve for said communicating means, preventing fluid flow therethrough from said outlet to said inlet, said check valve being urged in the closing direction by pressure at the outlet end of the assister; means providing fluid communication between said outlet and said inlet; and a check valve for controlling the last mentioned means, said check valve being urged in the opening direction by outlet pressure and urged in the closing direction by inlet pressure, said valve having an effective pressure area subjected to inlet pressure which is substantially larger than the area of the communicating means which it controls so that said check valve is maintained closed by inlet pressure substantially less than outlet pressure.

2. In a hydraulic assister: a cylinder having a large diameter portion with an inlet and a small diameter portion with an outlet; a differential piston slidable in said cylinder and dividing same into large diameter and small diameter chambers; a passage extending axially through said piston; a spring urged valve member slidably received in said passage for controlling fluid flow therethrough, said valve member being urged in the closing direction by said spring and the fluid pressure in the large diameter chamber, there being a fluid passage through said valve member for connecting the large diameter chamber with the small diameter chamber; a check valve preventing fluid flow through the passage in the valve member from the small diameter chamber to the large diameter chamber; and relatively light yielding means urging the piston toward the outlet end of said cylinder.

3. In a hydraulic assister: a cylinder having a large diameter portion with an inlet and a small diameter portion with an outlet; a differential piston slidable in said cylinder and dividing same into large diameter and small diameter chambers located adjacent the respective ends of the assister; a passage extending longitudinally through said piston; a valve member slidably received in said passage for controlling fluid flow between said valve member and the adjacent wall of said passage, said valve member being urged in the closing direction by fluid pressure in the large diameter chamber, there being a fluid passage through said valve member for connecting the large diameter chamber with the small diameter chamber; a check valve for automatically preventing fluid flow through the passage in the valve member form the small diameter chamber to the large diameter chamber; and relatively light yielding means urging the piston toward the outlet end of said cylinder.

4. In a hydraulic assister: a cylinder having a large diameter portion with an inlet and a small diameter portion with an outlet; a differential piston slidable in said cylinder and dividing same into large diameter and small diameter chambers located adjacent the respective ends of the assister; a passage extending longitudinally through said piston; a valve member slidably received in said passage for controlling fluid flow between said valve member and the adjacent wall of said passage, said valve member being urged in the closing direction by fluid pressure in the large diameter chamber, there being a fluid passage through said valve member for connecting the large diameter chamber with the small diameter chamber; and a check valve for automatically preventing fluid flow through the passage in the valve member from the small diameter chamber to the large diameter chamber.

5. In a hydraulic assister: a cylinder having a large diameter portion and a small diameter portion; a differential piston slidable in said cylinder and dividing same into a large diameter chamber having an inlet located adjacent the top thereof and a small diameter chamber having an outlet located adjacent the top thereof; a passage extending longitudinally through said piston; a spring urged valve member slidably received in said passage for controlling fluid flow therethrough between said member and the adjacent wall of said passage, said valve member being urged in the closing direction by said spring and fluid pressure in the large diameter chamber, there being a fluid passage through said valve member for connecting the large diameter chamber with the small diameter chamber; a check valve for preventing fluid flow through the passage in the valve member from the small diameter chamber to the large diameter chamber; and relatively light yielding means urging the piston toward the outlet end of said cylinder.

6. In a hydraulic assister: a cylinder having a large diameter portion and a small diameter portion; a differential piston slidable in said cylinder and dividing same into a large diameter chamber having an inlet and a small diameter chamber having an outlet; a passage extending axially through said piston; a valve member slidably received in said passage for controlling fluid flow therethrough, said valve member having one end extending into the large diameter chamber, there being a fluid passage through said valve member for connecting the large diameter chamber with the small diameter chamber; an annular extension on said piston surrounding the portion of the valve member which projects into said large diameter chamber, said extension having a vent through the wall thereof adjacent its top; a spring retainer adjacent the outer end of said extension; a spring engaging said spring retainer and urging the valve member in the closing direction; a relatively light spring having a portion thereof surrounding said extension and urging the piston toward the outlet end of said assister; and a check valve for automatically preventing fluid flow through the passage in the valve member from the small diameter chamber toward the diameter chamber.

7. In a hydraulic assister: a cylinder having a larger diameter portion and a small diameter portion, there being a shoulder formed at the junction of said portions; a differential piston slidable in said cylinder and dividing same into a large diameter chamber having an inlet and a small diameter chamber having an outlet; a passage extending through said piston; a spring urged valve member slidably received in said passage for controlling the fluid flow therethrough, said valve member being urged in the closing direction by said spring, there being a fluid passage through said valve member for connecting the large diameter chamber with the small diameter chamber; a check valve for preventing fluid flow through the passage in the valve member from the small diameter chamber; a bleed passage having its inner end terminating at the shoulder and having its outer end connected with atmosphere; and a check valve for said bleed passage permitting air to pass outwardly through said bleed passage but preventing air flow in the opposite direction.

8. In a hydraulic assister: a cylinder having a large diameter portion and a small diameter portion; a differential piston member slidable in said cylinder and dividing same into a large diameter chamber having an inlet and a small diameter chamber having an outlet; a passage extending axially through said piston; a valve member slidably received in said passage and having a fluid passage therethrough for connecting the large diameter chamber with the small diameter chamber; grooves in one of said members for the flow of fluid from the small diameter chamber to the large diameter chamber, said grooves being adapted to be closed by said valve member; and a check valve for preventing fluid flow through the passage in the valve member from the small diameter chamber to the large diameter chamber.

9. The invention defined by claim 8, wherein the grooves are in the outer surface of the valve member.

10. In a hydraulic assister: a body member having a cylinder therein with a large diameter portion and a small diameter portion, the outer end of the large diameter portion of said cylinder being internally threaded; a closure for the outer end of said large diameter portion including a part threadably connected with said threads and an inlet communicating with the top of said cylinder; a differential piston slidable in said cylinder and dividing same into a large diameter chamber in communication with said inlet and a small diameter chamber having an outlet; a passage extending axially through said piston; a spring urged valve member slidably received in said passage for automatically controlling the flow of fluid therethrough, said valve member being urged in the closing direction by said spring and fluid pressure in the large diameter chamber, there being an axially extending fluid passage through said valve member for connecting the large diameter chamber with the small diameter chamber; a check valve for automatically preventing fluid flow through the passage in the valve member from the small diameter chamber to the large diameter chamber; and a relatively light spring, reacting between said closure and the differential piston, for urging said piston toward the outlet end of said cylinder.

11. In a hydraulic brake system: a hydraulic master cylinder unit; an assister having a cylinder with a large diameter portion and a small diameter portion; a differential piston slidable in said cylinder and dividing same into a large diameter chamber having a connection with the master cylinder unit and a small diameter chamber having an outlet for connection with the cylinders of brake units to be energized; a connection between the inlet and outlet of said assister; a spring urged check valve controlling said connection and urged in the closing direction by said spring and inlet pressure for preventing the flow of fluid from the outlet to the inlet; a second connection between the outlet and inlet; a check valve for controlling the second connection, said check valve being urged in the closing direction by outlet pressure; and relatively light yielding means urging the piston toward the outlet end of the cylinder.

12. In a fluid pressure assister having an inlet adapted to be connected to a source of fluid pressure and an outlet adapted to be connected to a device to be energized: movable differential pressure means having faces of different effective area, said outlet being in fluid communication with the smaller face of said differential pressure means; means providing fluid communication between said inlet and outlet; check valve means for said communicating means, said check valve means permitting transmission of fluid pressure from the inlet to the outlet and preventing said fluid pressure to flow in the reverse direction, so as to hold the energizing pressure at the outlet of said assister; a second means providing fluid communication between said outlet and said inlet; and check valve means for controlling said second mentioned communicating means, said check valve means preventing the transmission of fluid pressure from the inlet to the outlet when closed and being urged closed by inlet pressure.

GILBERT E. PORTER.

REFERENCES CITED

The following references are of record in the file of this patent:

UNITED STATES PATENTS

| Number | Name | Date |
| --- | --- | --- |
| 2,124,761 | Carroll | July 26, 1938 |
| 2,351,153 | Schnell | June 13, 1944 |